(12) United States Patent
Uesugi et al.

(10) Patent No.: US 7,645,067 B2
(45) Date of Patent: Jan. 12, 2010

(54) HOMOGENIZER

(75) Inventors: Masakazu Uesugi, Yamanashi-ken (JP); Masahiro Tsunofuri, Yamanashi-ken (JP); Shotaro Mizobuchi, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 186 days.

(21) Appl. No.: 11/819,022

(22) Filed: Jun. 25, 2007

(65) Prior Publication Data
US 2008/0175096 A1    Jul. 24, 2008

Related U.S. Application Data

(62) Division of application No. 10/692,751, filed on Oct. 27, 2003, now abandoned.

(30) Foreign Application Priority Data

Nov. 11, 2002    (JP)    ............................... 2002-326506

(51) Int. Cl.
*B01F 5/12*    (2006.01)
(52) U.S. Cl. ....................... 366/262; 366/331
(58) Field of Classification Search .............. 366/185.1, 366/165.1, 331, 263, 262, 349, 279, 165.3
See application file for complete search history.

(56) References Cited

U.S. PATENT DOCUMENTS

| | | | |
|---|---|---|---|
| 1,790,967 A | 2/1931 | Auerbach | |
| 2,239,152 A | 4/1941 | Oystein | |
| 2,272,573 A | 2/1942 | Messmore | |
| 2,853,280 A | 9/1958 | Cusi | |
| 2,854,298 A * | 9/1958 | Baumeister | .................. 384/371 |
| 3,018,091 A | 2/1962 | Duggins | |
| 3,377,113 A * | 4/1968 | Wilson | ........................ 384/100 |
| 3,669,517 A * | 6/1972 | Hughes | ........................ 384/115 |
| 3,995,838 A | 12/1976 | Zucker et al. | |
| 4,172,668 A | 10/1979 | Thompson et al. | |
| 4,529,321 A | 7/1985 | Berchoux | |
| 4,828,403 A * | 5/1989 | Schwartzman | ............... 384/100 |
| 5,005,990 A | 4/1991 | Wotring | |
| 5,067,528 A * | 11/1991 | Titcomb et al. | ................. 141/4 |
| 5,827,042 A | 10/1998 | Ramsay | |
| 5,984,627 A | 11/1999 | Ramsay | |

(Continued)

OTHER PUBLICATIONS

"Homogenizing and Mixing Technology of Production", Megatron Dispersing and Mixing Technology by Kinematica, Kinematica AG, Switzerland (4 pages).

*Primary Examiner*—Tony G Soohoo
(74) *Attorney, Agent, or Firm*—Rader Fishman & Grauer PLLC; Carl Schaukowitch

(57) ABSTRACT

A homogenizer is disclosed, which can produce an emulsion with a grain diameter as extremely fine as approximately 1 μm without using large-scale equipment such as a high-pressure pump, and in which a grain diameter distribution of the produced emulsion exhibits sharp characteristics in the vicinity of a target grain diameter. A fixed portion and a disc-shaped agitation rotor are arranged in an opposing manner through a predetermined clearance to constitute a thrust hydrodynamic bearing, and while supporting a rotation of the agitation rotor with respect to the fixed portion by the thrust hydrodynamic bearing, a plurality of mutually incompatible raw liquids A and B are introduced into the bearing clearance to be mixed and agitated in the bearing clearance in accordance with the rotation of the agitation rotor.

4 Claims, 3 Drawing Sheets

U.S. PATENT DOCUMENTS 6,210,103 B1  4/2001 Ramsay
6,368,052 B2  4/2002 Uesugi et al.
6,869,212 B2  3/2005 Uesugi et al.
2002/0060950 A1  5/2002 Furukawa
2003/0030225 A1  2/2003 Uesugi et al.
2003/0147302 A1  8/2003 Uesugi et al.

* cited by examiner

HOMOGENIZER

This is a divisional application of application Ser. No. 10/692,751 filed on Oct. 27, 2003, (now abandoned,) the entirety of which is incorporated by reference for all purposes.

BACKGROUND OF THE INVENTION

1. Field of the Invention

The present invention relates to a homogenizer for use, for example, when mechanically mixing and agitating a plurality of mutually incompatible liquids to atomize, emulsify, and disperse the liquids. Particularly, the present invention relates to an improvement for obtaining a sharp grain diameter distribution in conformity with a target grain diameter when atomizing the liquids.

2. Description of the Related Art

In recent years, $NO_x$ and suspended particulate matter (SPM) such as soot, which are contained in exhaust gas of a diesel engine, have been a great social problem from a viewpoint of an environment load. As measures for solving such a problem relating to the exhaust gas, a diesel engine using water emulsion fuel has been proposed and brought to a commercial stage. This water emulsion fuel is fuel prepared by mixing and emulsifying light oil and water, and it has been reported that amounts of SPM and $NO_x$ emissions are significantly lowered in the diesel engine using the fuel.

This water emulsion fuel is, for example, one prepared in such a manner that oil and water are mixed at a ratio of 1:1, followed by atomization of the mixed matter to a grain diameter of approximately 1 μm, and emulsification thereof. In order to ensure stable engine combustion, it is important for a grain diameter distribution to concentrate on a narrow range centered on 1 μm without being expanded to a great extent.

Conventionally, as an apparatus for mixing and agitating two mutually incompatible liquids like water and oil, various types of homogenizers are publicly known, which are frequently used in production equipment for foods, chemical products, or the like, experimental plants, etc. Among these homogenizers, a so-called rotor/stator type homogenizer, a high-pressure homogenizer, and the like are known as homogenizers suitable for producing emulsions.

As the rotor/stator type homogenizer, one whose brand name is "Megatron (http://www.kinematica.ch/English/)", which is made by KINEMATICA AG (Switzerland), one whose brand name is "Clearmix (http:www.organo.co.jp/prod/clearmix/)", which is made by ORGANO CORPORATION, and the like, are known. Each of these rotor/stator type homogenizers includes a cylindrical stator fixed inside an agitation chamber, and a rotor which is accommodated in a hollow of the stator and imparted with a predetermined number of revolutions by a motor, the stator and rotor having a plurality of radially formed flow passages. After being mixed, the two mutually incompatible liquids are supplied to a hollow of the rotor by a pump. When the rotor starts to rotate in a state where these liquids are being supplied, a centrifugal force is applied to the liquids, which are then ejected from the radial flow passages formed in the rotor to enter a clearance between the rotor and the stator, further entering radial flow passages of the stator. The stator does not rotate but remains stationary, so that when the rotor starts to rotate, a vortex flow is generated in the liquids existing in the radial flow passages of the rotor and the stator. Furthermore, a shearing force in accordance with a rotational speed of the rotor is applied to the liquids having entered the clearance between the rotor and the stator. By means of energy of the vortex flow and shearing force, the two liquids are homogenized and eventually discharged as an emulsion to the outside through the radial flow passages formed in the stator.

In order to homogenize more efficiently, in other words, atomize the two liquids in this rotor/stator type homogenizer, it is important to apply a great shearing force to the liquids introduced into the clearance between the rotor and the stator. For this purpose, it is important to set the clearance defined between the inner peripheral surface of the stator and the outer peripheral surface of the rotor to be small. However, in practice, the clearance between the stator and the rotor cannot be set very small, and thus the rotor/stator type homogenizer is not suitable for producing an extremely fine grained emulsion of which grain diameter is no more than 1 μm. Meanwhile, in the case of throwing extremely large energy to the homogenizer by increasing the number of revolutions of the rotor or in other ways, though a production of the emulsion with the fine grain diameter can be expected, the produced emulsion has disadvantages in that the grain diameter distribution thereof does not exhibit sharp characteristics and that the grain diameter of the emulsion is undesirably distributed in a wide range.

Meanwhile, as the latter- high-pressure homogenizer, for example, one whose brand name is "Nanomizer," which is made by Nanomizer Corporation, is known. This high-pressure homogenizer includes a generator in which capillaries having a hole diameter of approximately 0.25 mm are formed, and a high-pressure pump which fills, with pressure, the capillaries of the generator with a liquid. The high-pressure homogenizer is constructed in such a manner that two liquids to be made into an emulsion are mixed together and then are passed through the capillaries of the generator, whereby energy of a shock wave and cavitation is applied to the liquids in the capillaries, and an emulsion with a fine grain diameter is obtained due to the energy. This high-pressure homogenizer has an advantage in that an emulsion with a smaller grain diameter can be obtained in comparison with the rotor/stator type homogenizer described above because an amount of the energy thrown to the liquids per unit area is large. However, the high-pressure homogenizer has a problem in that there is an upper limit (approximately 500 cps) to the viscosity of the liquids to be atomized, and that types of liquids which can be processed by the high-pressure homogenizer are limited. Moreover, the high-pressure homogenizer has a problem in that an amount of the liquids, which can be processed per unit time, is extremely small because the liquids are passed through the capillaries with an extremely small inner diameter, and that, in order to increase a throughput, it is necessary to raise pressure generated by the above-described high-pressure pump, leading to undesirable enlargement of pump equipment in scale. Furthermore, though the high-pressure homogenizer can produce the emulsion with the fine grain diameter of approximately 1 μm, a grain diameter distribution of the produced emulsion has a width of approximately 0.5 μm with the fine grain diameter of 1 μm as the center. Thus, it cannot be said that the grain diameter distribution exhibits sharp characteristics.

SUMMARY OF THE INVENTION

The present invention has been made in view of the above problems, and it is therefore an object of the invention to provide a homogenizer which can produce an emulsion with a grain diameter as extremely fine as approximately 1 μm without using large-scale equipment such as a high-pressure pump, in which a grain diameter distribution of the produced emulsion exhibits sharp characteristics in the vicinity of a target grain diameter.

In order to attain the above object, the homogenizer of the present invention is one utilizing the construction of a publicly known thrust hydrodynamic bearing. The thrust hydrodynamic bearing is one in which a fixed portion and a disc-shaped thrust plate are arranged to be opposed to each other through a bearing clearance of, for example, approximately 3 to 10 μm, and a lubricating fluid such as water and oil is introduced into such a bearing clearance. The thrust hydrodynamic bearing is constructed such that the lubricating fluid present in the bearing clearance is pressurized in accordance with a rotation of the thrust plate, thereby forming a high-pressure fluid lubricating film between the fixed portion and the rotating thrust plate. The thrust plate comes into a floating state with respect to the fixed portion by means of this fluid lubricating film, and the rotation thereof is supported in this floating state as it is. In this thrust hydrodynamic bearing, when the thrust plate rotates, a shearing force is applied between the lubricating fluid and the thrust plate, and the lubricating fluid is pressurized by the shearing force while being taken around a circumferential direction of the thrust plate, and thus the above-described fluid lubricating film is formed. Hence, in accordance with the rotation of the thrust plate, the shearing force is applied to the lubricating fluid present in the bearing clearance, and energy imparted to the lubricating fluid by the application of this shearing force can be freely adjusted by changing a rotational speed of the thrust plate. Moreover, with regard to the rotational speed, it is possible to impart the thrust plate with several tens of thousands of revolutions per minute because the thrust plate is kept in a non-contact state with respect to the fixed portion. Furthermore, as described above, it is possible to rotate the thrust plate at high speed in the state where the bearing clearance of several micrometers is maintained in the thrust hydrodynamic bearing.

From the above view points, in the invention of this application, constructed is a homogenizer for mixing and agitating a plurality of mutually incompatible raw liquids that are present in a bearing clearance of a thrust hydrodynamic bearing in accordance with a rotation of an agitation rotor, in which the plurality of raw liquids are introduced into the bearing clearance and the thrust plate is used to serve as the agitation rotor.

According to the homogenizer as described above of the present invention, the bearing clearance of the thrust hydrodynamic bearing is as extremely small as several micrometers. Accordingly, when the agitation rotor rotates, an extremely large shearing force is applied to the raw liquids, the raw liquids are atomized by means of energy imparted thereto by the shearing force, and the plurality of mutually incompatible liquids can be made into an emulsion. Moreover, when the agitation rotor is regulated in its movement in an axial direction, it is possible to maintain the bearing clearance of the thrust hydrodynamic bearing constant, for example, at a size of 3 μm or less. Therefore, it also becomes possible to stably produce an emulsion with a grain diameter of 1 μm or less. Furthermore, the homogenizer to which the structure of the thrust hydrodynamic bearing is applied in such a manner can produce the emulsion irrespective of the viscosity of the raw liquids, and accordingly, it is possible to adapt the homogenizer to a wide variety of applications. In addition, the homogenizer can be constructed to be extremely small because accessory equipment such as a high-pressure pump is not required, and for example, it also becomes possible to attach the homogenizer as a homogenizer in line with a variety of devices.

DESCRIPTION OF THE PREFERRED EMBODIMENTS

A rotor/stator type homogenizer of the present invention will be described below in detail based on the accompanying drawings.

Figure 1:
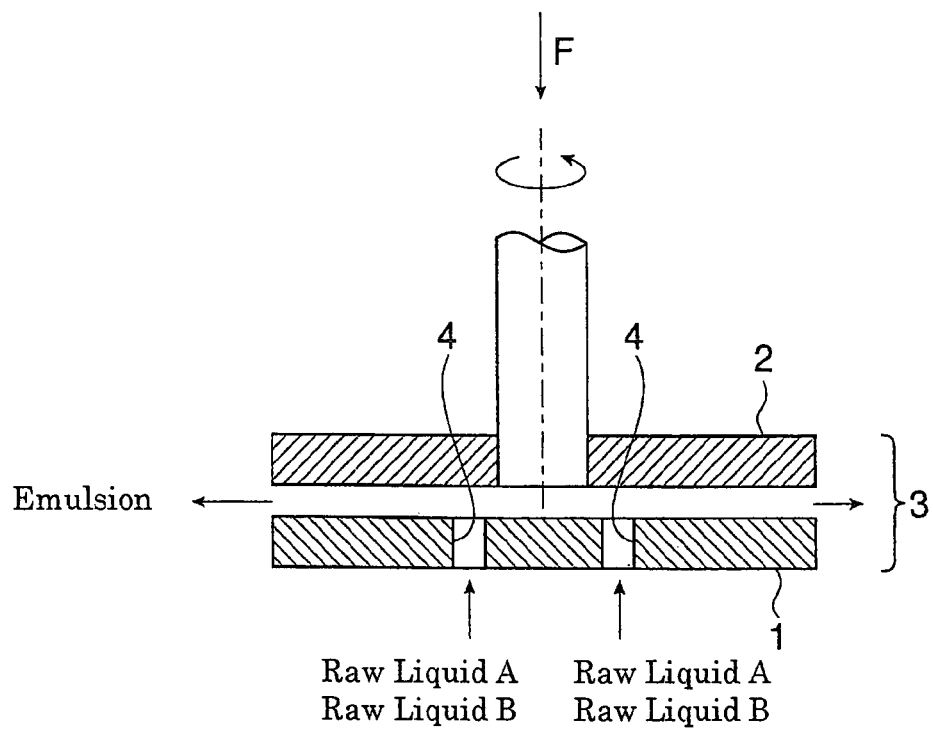
FIG. 1 is a cross-sectional view showing a basic construction of a homogenizer of the present invention.

FIG. 1 is a view showing a basic construction of the homogenizer of the present invention. As shown in this drawing, the homogenizer of the present invention basically includes a fixed portion 1, and a disc-shaped agitation rotor 2 arranged to be opposed to the fixed portion 1, in which a rotation in one direction is imparted to the agitation rotor 2 by an unillustrated motor. The agitation rotor 2 and the fixed portion 1 are opposed to each other, for example, through a bearing clearance of approximately 5 μm, and they together constitute a thrust hydrodynamic bearing 3. Both of the agitation rotor 2 and the fixed portion 1 are formed of a ceramic material and provided with high abrasion resistance to a high-pressure fluid formed in the bearing clearance. In addition, introduction ports 4 which communicate with the bearing clearance are formed in the fixed portion 1, and two mutually incompatible raw liquids A and B are introduced from the introduction ports 4 to the bearing clearance in a premixed state.

Figure 2:
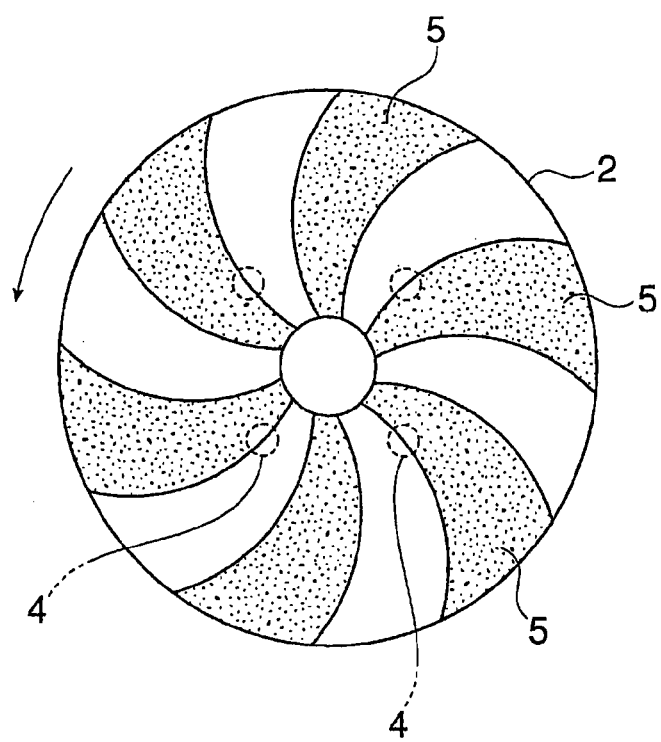
FIG. 2 is a plan view showing agitation grooves formed in an agitation rotor shown in FIG. 1.

As shown in FIG. 2, spiral-shaped agitation grooves 5 are defined on one surface of the agitation rotor 2 which is opposed to the fixed portion 1. Note that FIG. 2 is a plan view and regions of the agitation grooves 5 are indicated by dots because it is difficult to discriminate between regions in which the agitation grooves 5 are defined and other regions. These agitation grooves 5 are formed to have a depth of approximately 5 to 50 μm, and exert a shearing force to the raw liquids A and B introduced into the bearing clearance from the introduction ports 4 in accordance with a rotation of the agitation rotor 2, to mix and agitate the raw liquids A and B while applying pressure thereto. In addition, a winding direction of the agitation grooves 5 formed spirally is a direction of pressuring the raw liquids A and B present in the bearing clearance from the inside to the outside in a radius direction with respect to a rotating direction of the agitation rotor 2, which is indicated by an arrow in FIG. 2. In view of the above, the introduction ports 4 are defined in the vicinity of a rotation center of the agitation rotor 2 (positions corresponding to the introduction ports 4 on the agitation rotor 2 are shown by broken lines in FIG. 2). Moreover, when the agitation rotor 2 rotates, the raw liquids A and B are naturally aspirated from the introduction ports 4 to the bearing clearance, and a flow directed from the inner diameter side to the outer diameter side in the radius direction is formed in the bearing clearance.

With the above construction, when the agitation rotor 2 rotates, the raw liquids A and B present in the bearing clearance are pressurized by the agitation grooves 5, and a high-pressure fluid lubricating film containing the raw liquids A and B as the lubricating fluid is formed in the bearing clearance described above. Thus, the agitation rotor 2 comes into a floating state with respect to the fixed portion 1, with its rotation being supported in a non-contact manner with respect to the fixed portion 1. As described above, the agitation rotor 2 rotates while maintaining the non-contact state with respect to the fixed portion 1, and accordingly, rotational resistance is hardly applied to the agitation rotor 2, except a viscous drag of the lubricating fluid present in the bearing clearance. Therefore, it is possible to rotate the agitation rotor 2 at high speed of several tens of thousands of revolutions per minute. However, as the rotational speed of the agitation rotor 2 is increased, a correspondingly larger pressure is generated in the bearing clearance. Accordingly, in order to maintain the constant bearing clearance between the agitation rotor 2 and the fixed portion 1 against this pressure, it is necessary to apply an external force F to the agitation rotor 2 in a rotation axis direction thereof and to balance this external force F with the pressure of the fluid lubricating film.

Then, when the agitation rotor 2 rotates at the high speed as described above, a large shearing force is applied to the raw liquids A and B aspirated from the introduction ports 4 into the bearing clearance. By means of the energy of this shearing force, the raw liquids A and B are atomized while flowing in the bearing clearance. Finally, the raw liquids A and B are made into an emulsion and discharged from an outer circumferential edge of the agitation rotor 2 to the outside of the bearing clearance. In this case, it is possible to control the grain diameter of the emulsion by adjusting the size of the bearing clearance between the agitation rotor 2 and the fixed portion 1. If the bearing clearance is set at approximately 3 μm, an emulsion with a grain diameter of 1 μm or less can be obtained. Moreover, an increase in the rotational speed of the agitation rotor 2 enables the amount of energy thrown for the atomization to be increased. Hence, it is possible to adjust the grain diameter of the emulsion also by such an adjustment of the rotational speed.

Hence, according to the homogenizer of the present invention, the raw liquids A and B, which are mutually incompatible like water and oil, can be mixed to prepare the emulsion. Moreover, grain diameters of grain drops constituting the emulsion can be freely adjusted to a target size, and an emulsion having a sharp grain diameter distribution can be obtained. Moreover, when rotation of the agitation rotor 2 is started, the raw liquids A and B are naturally aspirated to the bearing clearance, and accordingly, a pump which supplies the raw liquids to the homogenizer is not required, thus making it possible to construct an extremely simple and compact homogenizer.

Figure 3:
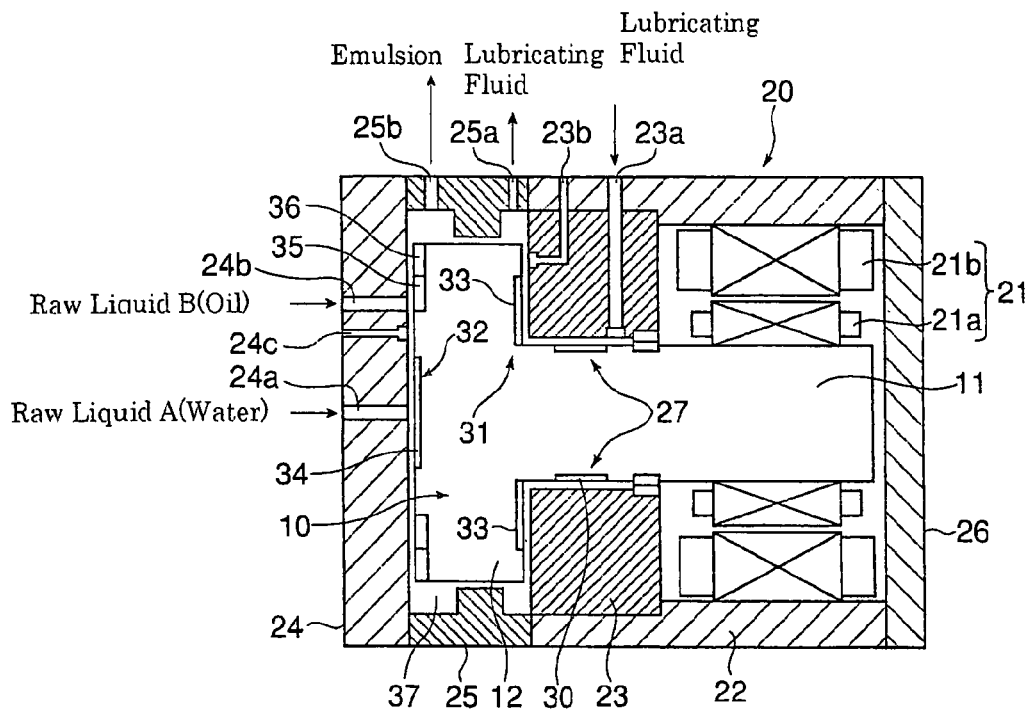
FIG. 3 is a cross-sectional view showing a first embodiment of a homogenizer to which the present invention is applied.

FIG. 3 shows a first embodiment of a homogenizer to which the present invention is concretely applied. This homogenizer includes an agitation rotor 10 and a housing 20 which accommodates this agitation rotor 10. Furthermore, the housing 20 includes a cylindrical motor housing 22 accommodating a motor 21, a donut-shaped bearing ring 23 fixed to an inner circumferential surface of the motor housing 22, a fixed plate (fixed portion) 24 which constitutes a thrust hydrodynamic bearing together with the agitation rotor 10, a spacer ring 25 which adjusts an interval between the bearing ring 23 and the fixed plate 24, and an end plate 26 which closes an open end of the motor housing 22.

The agitation rotor 10 includes a journal portion 11 as a main rotation shaft, and a disc-shaped flange portion 12 which overhangs from one end of the journal portion 11. The agitation rotor 10 has a longitudinal cross section formed into an approximately T shape along a center of a rotation axis, and is accommodated in the housing 20 in a state where the journal portion 11 is penetrated through the bearing ring 23. On a tip of the journal portion 11, a motor rotor 21a is fixed, which constitutes the motor 21 together with a motor stator 21b fixed to the motor housing 22. A rotation is imparted to the agitation rotor 10 by the motor 21.

A bearing clearance of approximately 5 μm is formed between the outer circumferential surface of the journal portion 11 and the inner circumferential surface of the bearing ring 23. The bearing ring 23 and the journal portion 11 of the agitation rotor 10 constitute a radial hydrodynamic bearing 27. A supply port 23a which communicates with the outside of the housing 20 is opened in the bearing ring 23 in order to introduce a lubricating fluid into the bearing clearance of the radial hydrodynamic bearing 27. Here, as the lubricating fluid for the radial hydrodynamic bearing 27, liquids such as water and oil can be selected as appropriate. On the outer circumferential surface of the journal portion 11 of the agitation rotor 10, pressurization grooves 30 with a depth of approximately 10 to 50 μm, which are repeatedly continuous in the circumferential direction, are formed at positions opposed to the inner circumferential surface of the bearing ring 23. When the agitation rotor 10 rotates, the pressurization grooves 30 pressurize the lubricating fluid present in the bearing clearance to form a high-pressure fluid lubricating film in the clearance between the journal portion 11 and the bearing ring 23. Thus, a rotation of the agitation rotor 10 is supported in a state where the journal portion 11 is centered on the center of the bearing ring 23.

Meanwhile, the spacer ring 25 interposed between the bearing ring 23 and the fixed plate 24 is formed such that a thickness thereof in an axial direction is slightly larger than a thickness of the flange portion 12 of the agitation rotor 10 in the axial direction. When the flange portion 12 is accommodated between the bearing ring 23 and the fixed plate 24, the bearing clearances are defined on both sides of the flange portion 12, and the both front and back surfaces of the flange portion 12 constitute a pair of thrust hydrodynamic bearings 31 and 32, together with the bearing ring 23 and the fixed plate 24. The pair of thrust hydrodynamic bearings 31 and 32 formed on the both surfaces of the flange portion 12 regulate a movement of the agitation rotor 10 in the rotation axis direction in the housing 20.

In the thrust hydrodynamic bearing 31 located on the backside of the flange portion 12, spiral pressurization grooves 33 with a depth of approximately 10 to 50 μm, which are repeatedly continuous in the circumferential direction, are formed on the back of the flange portion 12. The bearing clearance of this thrust hydrodynamic bearing 31 communicates with the bearing clearance of the radial hydrodynamic bearing 27. The lubricating fluid supplied from the supply port 23a to the bearing clearance of the radial hydrodynamic bearing 27 flows into the bearing clearance of the thrust hydrodynamic bearing 31. Here also, a high-pressure fluid lubricating film is formed in accordance with the rotation of the agitation rotor 10. Moreover, the lubricating fluid pressurized in the bearing clearance of the thrust hydrodynamic bearing 31 is discharged from the outer circumferential edge of the flange portion 12 of the agitation rotor 10 to the outside of the bearing clearance. Then, the lubricating fluid is discharged from a discharge port 25a defined in the spacer ring 25 to the outside of the housing 20.

Figure 4:
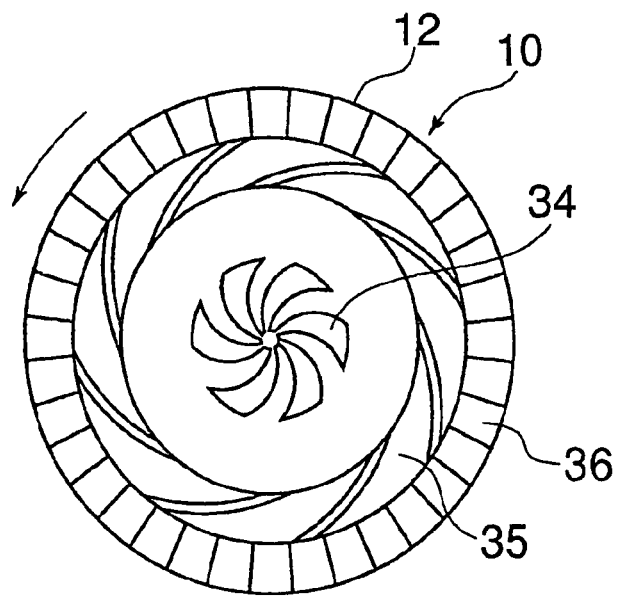
FIG. 4 is a view showing pressurization grooves, pumping groves, and agitation grooves, which are formed on a surface of an agitation rotor according to the first embodiment.

Meanwhile, in the thrust hydrodynamic bearing 32 located on the front surface side of the flange portion 12, spiral pressurization grooves 34 with a depth of approximately 10 to 50 µm, which are repeatedly continuous in the circumferential direction, are also formed on the surface of the flange portion 12. FIG. 4 is a view showing the surface of the agitation rotor opposed to the fixed plate. As shown in this drawing, the pressurization grooves 34 are spirally extended from the rotation center of the agitation rotor, and an introduction port 24a for the raw liquid A is opened so as to correspond to the center of the pressurization grooves 34. When the agitation rotor 10 rotates, the pressurization grooves 34 aspirate the raw liquid A from the introduction port 24a into the bearing clearance, and act to pressurize the raw liquid A toward the outer circumferential edge of the flange portion 12. Specifically, in the thrust hydrodynamic bearing 32, it is the raw liquid A that serves as the lubricating fluid. In addition, the pressurization grooves 34 also function as pumping grooves, which aspirate the raw liquid A into the housing 20 and then send out the liquid toward the outer circumferential edge of the flange portion 12.

Moreover, on the surface of the flange portion 12, pumping grooves 35, which are also spiral-shaped, are formed repeatedly in the circumferential direction so as to surround the pressurization grooves 34 from the outside with respect to the radius direction. At a position of the fixed plate 24 which is opposed to the pumping grooves 35, an introduction port 24b for the raw liquid B is opened. The pumping grooves 35 are formed to have a depth of approximately 20 to 100 µm, which is larger than the depth of the pressurization grooves 34. The pumping grooves 35' act to aspirate the raw liquid B from the introduction port 24b into the bearing clearance when the agitation rotor 10 rotates and to send out this raw liquid B and the raw liquid A sent by the pressurization grooves 34 toward the outer circumferential edge of the flange portion 12 while agitating the both raw liquids.

Furthermore, on the surface of the flange portion 12, radial agitation grooves 36 are repeatedly formed in the circumferential direction so as to surround the pumping grooves 35 from the outside with respect to the radius direction. These agitation grooves 36 are open to the outer circumferential edge of the flange portion 12. The raw liquids A and B flowing in the clearance between the flange portion 12 and the fixed plate 24 toward the outer circumferential edge of the flange portion 12 by means of actions of the pressurization and pumping grooves 34 and 35 are flown into the agitation grooves 36 eventually. Then, the raw liquids A and B are discharged from the agitation grooves 36 toward the outside in the radius direction by means of a centrifugal force.

In such a way, the raw liquids A and B are aspirated into the clearance between the flange portion 12 of the agitation rotor 10 and the fixed plate 24, and flow toward the outer circumferential edge of the flange portion 12 in accordance with the rotation of the agitation rotor 10. In this process, the raw liquids A and B are imparted with a large shearing force due to the rotations of the pumping grooves 35 and agitation grooves 36, and are agitated while being atomized by means of the energy of this shearing force. Thus, the raw liquids A and B are formed into a homogenized emulsion, and are discharged from the agitation grooves 36 to the outer circumferential edge of the flange portion 12. The emulsion discharged from the agitation grooves 36 stays in a collection chamber 37 formed between the spacer ring 25 and the flange portion 12 of the agitation rotor 10, and then discharged from an ejection port 25b opened in the spacer ring 25 to the outside of the housing 20.

In the homogenizer of this embodiment thus constructed, the clearance between the flange portion 12 of the agitation rotor 10 and the fixed plate 24 serves as the bearing clearance of the thrust hydrodynamic bearing 32, and in general, it is possible to set the bearing clearance of the thrust hydrodynamic bearing at about several micrometers. Accordingly, it is also possible to set the clearance between the flange portion 12 and the fixed plate 24 at several micrometers. Therefore, when the agitation rotor 10 is rotated, a large shearing force can be applied to the raw liquids A and B flowing in the clearance, and an emulsion with a small grain diameter can be produced efficiently.

In the case where the thrust hydrodynamic bearings 31 and 32 are provided on the front and back of the flange portion 12 of the agitation rotor 10 as in this embodiment, the flange portion 12 is naturally positioned in the axial direction between the bearing ring 23 and the fixed plate 24 such that the pressures of the lubricating fluids pressurized in the bearing clearances of the respective thrust hydrodynamic bearings become equal to each other. In the case of this embodiment, the pressurization grooves 33 of the thrust hydrodynamic bearing 31 are provided outside the journal portion 11 of the agitation rotor 10, and rotate at peripheral speed faster than that of the pressurization grooves 34 of the thrust hydrodynamic bearing 32, which are spirally extended from the rotation center of the agitation rotor. Accordingly, the dynamic pressure of the lubricating fluid, which is generated in the bearing clearance of the thrust hydrodynamic bearing 31, becomes naturally larger than that in the bearing clearance of the thrust hydrodynamic bearing 32. Therefore, even if the thickness of the spacer ring 25 in the axial direction is set larger than the thickness of the flange portion 12, the bearing clearance of the thrust hydrodynamic bearing 32 on the front surface side of the flange portion 12 can be maintained to be small. For example, suppose a case where dimensions are set as: 40 mm for an outer diameter of the flange portion 12; 20 mm for an outer diameter of the pressurization grooves 34; 40 mm for an outer diameter of the pressurization grooves 33; 22.5 mm for an outer diameter of the journal portion 11; and 20 µm for a sum of the bearing clearances of the front and back of the flange portion 12, which are defined by the spacer ring 25. In this case, when the agitation rotor 10 is rotated at 50,000 rpm, the bearing clearance of the thrust hydrodynamic bearing 31 becomes 16 µm, and the bearing clearance of the thrust hydrodynamic bearing 32 becomes 4 µm. Thus, while avoiding as much as possible a solid contact of the agitation rotor 10 with the fixed plate 24 and the bearing ring 25 at the time of starting the rotation of the agitation rotor 10, the clearance between the fixed plate 24 and the flange portion 12 can be set extremely small at the time of a steady rotation of the agitation rotor 10. Accordingly, it is possible to efficiently apply the sharing force to the raw liquids A and B introduced into the clearance described above.

Moreover, in the case of this homogenizer, the grain diameter of the emulsion prepared by the rotation of the agitation rotor 10 depends on the size of the clearance between the flange portion 12 and the fixed plate 24. Accordingly, it is very convenient if the size of the clearance can be arbitrarily controlled, because this allows the grain diameter of the emulsion itself to be also controlled to some extent.

For this purpose, in the homogenizer of the first embodiment, which is shown in FIG. 3, pressure release ports 23b and 24c, which communicate with the bearing clearances of the thrust hydrodynamic bearings 31 and 32, respectively, are provided. Moreover, relief valves (not shown) are provided in the pressure relief ports 23b and 24c to control the pressures in the bearing clearances, thus making it possible to adjust the position of the flange portion 12 in the rotation axis direction between the bearing ring 25 and the fixed plate 24. Thus, it is possible to substantially distribute the grain diameter of the prepared emulsion in the vicinity of the target grain diameter.

In the homogenizer of the first embodiment, the pressurization grooves 34, the pumping grooves 35, and the agitation grooves 36 are formed separately from one another on the surface (surface opposed to the fixed plate) of the flange portion 12. However, as long as a sufficient shearing force can be imparted to the raw liquids A and B aspirated between the flange portion 12 and the fixed plate 24, and as long as the flange portion 12 can be kept in a non-contact state with respect to the fixed plate 24, there is no problem in forming only the spiral-shaped agitation grooves 5 on the surface of the flange portion 12, as shown in FIG. 1. However, in order to efficiently perform the respective functions, namely, the aspiration of the raw liquids A and B, the function as the thrust hydrodynamic bearings, and the mixing and agitation of the raw liquids A and B, it is possible to divide the surface of the flange portion 12 into three regions of a center circle region, an intermediate ring region, and an outer ring region, and to form grooves with shapes optimal for the respective regions as in this embodiment.

Figure 5:
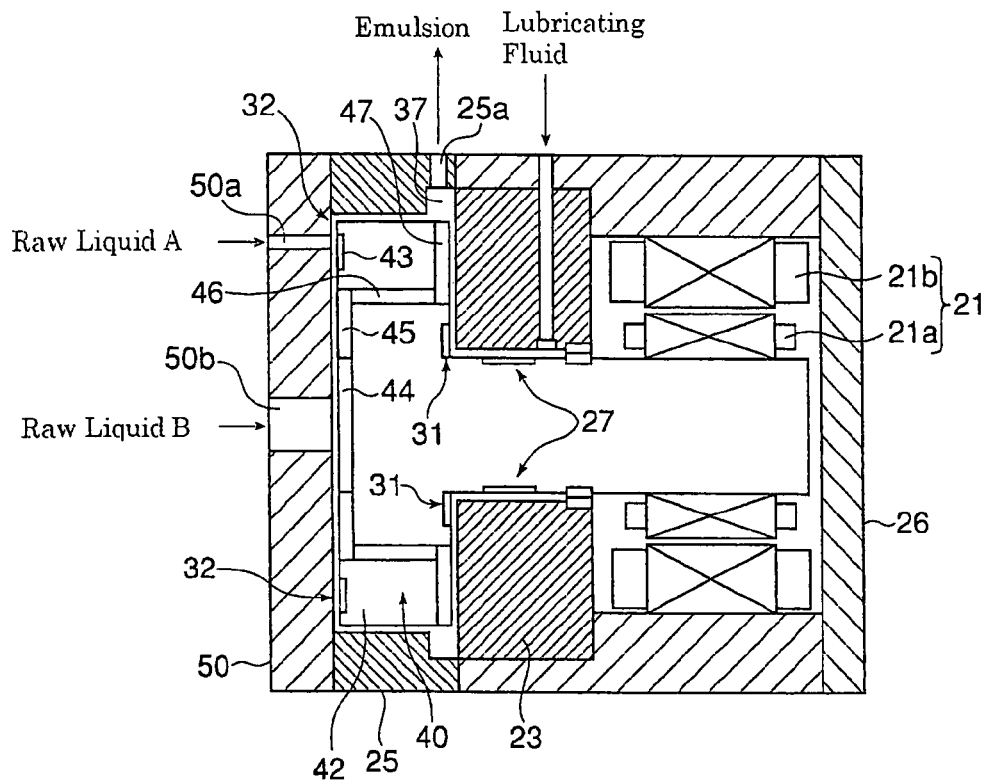
FIG. 5 is a cross-sectional view showing a second embodiment of the homogenizer to which the present invention is applied.

FIG. 5 is a view showing a second embodiment of the homogenizer to which the present invention is concretely applied. This homogenizer also has approximately the same structure as that of the homogenizer of the first embodiment, and mixes and agitates the raw liquids A and B in the bearing clearances of the thrust hydrodynamic bearings. However, in the second embodiment, arrangements and patterns of pressurization grooves 43, pumping grooves 44, agitation grooves 45, and the like, which are defined in a flange portion 42 of an agitation rotor 40, are different from those of the first embodiment. Note that the same reference numerals as those of the first embodiment are added to the same constituents as those of the first embodiment in FIG. 5, and detailed description thereof is omitted.

Figure 6:
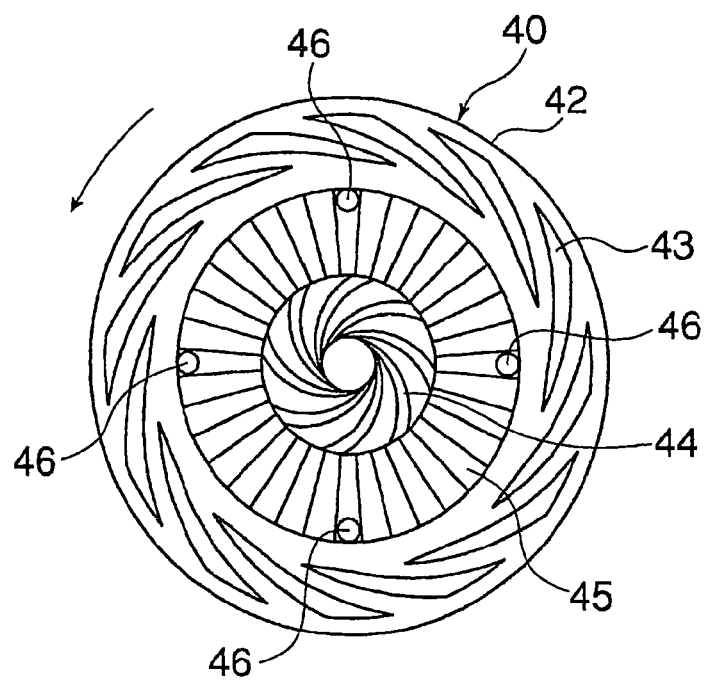
FIG. 6 is a view showing pressurization grooves, pumping groves, and agitation grooves, which are formed on a surface of an agitation rotor according to the second embodiment.

Defined on the surface (opposed surface to the fixed plate 24) of the flange portion 42 of the agitation rotor 40 are the pressurization grooves 43 which pressurize the raw liquid A as the lubricating fluid, the pumping grooves 44 which aspirate the raw liquid B into a clearance between a fixed plate 50 and the flange portion 42, and the agitation grooves 45 which mix and agitate the raw liquids A and B. As shown in FIG. 6, the pressurization grooves 43 are located on the outer diameter side than the agitation grooves 45 and the pumping grooves 44, and formed spirally to have a depth of approximately 10 to 50 μm. In accordance with a rotation of the agitation rotor 40, the pressurization grooves 43 pressurize the raw liquids A toward a rotation center of the agitation rotor 40, thereby forming a high-pressure fluid lubricating film between the fixed plate 50 and the flange portion 42. Thus, the rotation of the agitation rotor 40 is supported in a state where the agitation rotor 40 is kept in a non-contact state with respect to the fixed plate 50. Moreover, an introduction port 50a for the raw liquid A is opened at a position of the fixed plate 50 which is opposed to the pressurization grooves 43, and the raw liquid A is aspirated therethrough to the clearance between the fixed plate 50 and the flange portion 42 in accordance with the rotation of the agitation rotor 40.

The above-described pumping grooves 44 are formed spirally from a rotation center on a surface of the flange portion 42 to an outer diameter thereof. The depth of the pumping grooves 44 is approximately 10 to 50 μm, and the pumping grooves 44 are formed to be deeper than the pressurizing grooves 43. The pumping grooves 44 pressurize the raw liquid B to the outer diameter side of the flange portion 42 in accordance with the rotation of the agitation rotor 40. An introduction port 50b for the raw liquid B is opened at a position of the fixed plate 50 which is opposed to the pumping grooves 44, that is, at a position opposed to the rotation center of the agitation rotor 40. When the agitation rotor 40 rotates, the raw liquid B is aspirated from the introduction port 50b into the clearance between the fixed plate 50 and the flange portion 42 by means of an aspiration force generated by the pumping grooves 44.

Meanwhile, the above-described agitation grooves 45 are formed radially between the pressurization grooves 43 and the pumping grooves 44, and a depth thereof is approximately 20 to 100 μm. Hence, to the agitation grooves 45, the raw liquid A is flown from the outer diameter side thereof, and the raw liquid B is flown from the inner diameter side thereof. In accordance with the rotation of the agitation rotor 40, the raw liquids A and B are mixed and agitated in the clearance between the flange portion 42 and the fixed plate 50. Moreover, in the flange portion 42, through holes 46 are defined so as to correspond to outermost diameter positions of the agitation grooves 45, and the raw liquids A and B mixed and agitated in the agitation grooves 45 are adapted to pass through the through holes 46 to flow toward the backside of the flange portion 42.

Another agitation grooves 47 are radially formed on the backside (surface opposed to the bearing ring 23) of the flange portion 42. The raw liquids A and B fed with pressure through the through hole 46 from the front surface side of the flange portion 42 to the backside thereof are flown into these second agitation grooves 47, and then are discharged from the agitation grooves 47 to the outside thereof in the radius direction by means of the centrifugal force.

The raw liquids A and B are aspirated into the clearance between the flange portion 42 of the agitation rotor 40 and the fixed plate 50 in this way. In accordance with the rotation of the agitation rotor 40, the raw liquids A and B flow toward the outer circumferential edge of the flange portion 42. In this process, the raw liquids A and B are imparted with a large shearing force by means of the rotation of the first agitation grooves 45 provided on the front surface side of the flange portion and the rotation of the second agitation grooves 47 provided on the backside thereof. The raw liquids A and B are agitated while being atomized by means of the energy of this shearing force. Thus, the raw liquids A and B are made into a homogenized emulsion and discharged from the second agitation grooves 47 to the outer circumferential edge of the flange portion 42. The emulsion discharged from the agitation grooves 47 stays in a collection chamber 37 defined between the spacer ring 25 and the flange portion 42 of the agitation rotor 40, and then discharged from an ejection port 25b opened in the spacer ring 25 to the outside of the housing 20.

Then, also in this homogenizer of the second embodiment, the clearance between the flange portion 42 of the agitation rotor 40 and the fixed plate 50 serves as the bearing clearance of the thrust hydrodynamic bearing, and in general, it is possible to set the bearing clearance of the thrust hydrodynamic bearing at about several micrometers. Accordingly, it is also possible to set the clearance between the flange portion 42 and the fixed plate 50 at several micrometers. Therefore, when the agitation rotor 40 is rotated, a large shearing force can be applied to the raw liquids A and B flowing in the clearance, and an emulsion with a small grain diameter can be produced efficiently.

Particularly, in this homogenizer of the second embodiment, the peripheral speed of the pressurization grooves 43 in the thrust hydrodynamic bearing 32 is faster than that of the pressurization grooves 33 in the thrust hydrodynamic bearing 31. Accordingly, the clearance between the flange portion 42 and the bearing ring 23 tends to become smaller than the clearance between the flange portion 42 and the fixed plate 50. Therefore, after the raw liquids A and B are agitated and mixed by the first agitation grooves 45 to be made into an emulsion, the emulsion sent from the first agitation grooves 45 to the second agitation grooves 47 can be further atomized, leading to such an advantage that an emulsion with a small grain diameter can be stably prepared by the agitation performed in two steps.

As described above, according to the homogenizer of the present invention, the bearing clearance of the thrust hydrodynamic bearing into which the raw liquids are introduced is as extremely small as several micrometers, and when the agitation rotor rotates, an extremely large shearing force is applied to the raw liquids. This shearing force makes it possible to prepare an emulsion with a grain diameter as extremely fine as approximately 1 μm. Moreover, the grain diameter distribution of the produced emulsion becomes one exhibiting sharp characteristics in the vicinity of the target grain diameter. Furthermore, because the thrust hydrodynamic bearing itself exerts a function as a pump, large-scale equipment such as a high-pressure pump can be eliminated, thus making it possible to provide an extremely compact homogenizer with a simple structure.

What is claimed is:

1. A homogenizer comprising a-an agitator rotor including a disk-shaped flange portion, a housing constituting front and back thrust hydrodynamic bearings together with respective ones of front and back surfaces of the flange portion, and supporting a rotation of the agitator rotor by forming a high-pressure fluid lubricating film in respective front and back bearing clearances of the respective front and back thrust hydrodynamic bearings,
wherein a plurality of mutually incompatible raw liquids are introduced through at least one raw liquid inlet into the front bearing clearance to be mixed and agitated in the front bearing clearance by a rotation of the agitation rotor,
further comprising a plurality of grooves arranged radially or spirally along a circumferential direction on the front surface of the agitator rotor which is opposed to the housing,
wherein the one surface of the agitator rotor which is opposed to the fixed portion is divided into three regions of a center circle region, an intermediate ring region, and outer ring region,
the homogenizer further comprising: agitation grooves; spiral-shaped pumping grooves; and introduction ports for the plurality of raw liquids,
the agitation grooves being formed radially on anyone of three regions and extending in a diameter direction,
the pumping grooves being formed on the other two of the three regions for causing the plurality of raw liquids in the bearing clearance to flow into the agitation grooves by the rotation of the rotor,
the introduction ports being formed in the fixed portion at positions opposed to the pumping grooves of the agitator rotor.

2. A homogenizer according to claim 1, wherein the agitator rotor including a journal portion as a main rotation shaft, and the housing constitute a radial hydrodynamic bearing together with the journal portion of the agitator rotor.

3. A homogenizer according to claim 1 further comprising a pressure release port, the pressure release port communicating with the bearing clearance and connected with a relief valve for adjusting a pressure in the bearing clearance.

4. A homogenizer according to claim 1, wherein a lubricating fluid is introduced through a lubricating fluid inlet into the back bearing clearance.

* * * * *